US011279336B2

United States Patent
Feigel et al.

(10) Patent No.: US 11,279,336 B2
(45) Date of Patent: Mar. 22, 2022

(54) ELECTROHYDRAULIC MOTOR VEHICLE CONTROL DEVICE COMPRISING A HYDRAULIC UNIT COMPRISING ELECTRIC COMPONENTS FOR ACTUATING AN ELECTRIC MOTOR ARRANGED ON A SECOND CIRCUIT BOARD EMBODIED REDUNDANTLY IN TWO PARTS WHEREIN THE TWO PARTS DEFINE AT LEAST A PART OF AN OPENING THROUGH WHICH A PRESSURE SOURCE EXTENDS

(71) Applicant: Continental Teves AG & Co. oHG, Frankfurt am Main (DE)

(72) Inventors: Hans-Jörg Feigel, Rosbach (DE); Kristijan Tarandek, Neu-Isenburg (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 281 days.

(21) Appl. No.: 16/327,468

(22) PCT Filed: Sep. 19, 2017

(86) PCT No.: PCT/EP2017/073547
§ 371 (c)(1),
(2) Date: Feb. 22, 2019

(87) PCT Pub. No.: WO2018/054863
PCT Pub. Date: Mar. 29, 2018

(65) Prior Publication Data
US 2019/0202425 A1 Jul. 4, 2019

(30) Foreign Application Priority Data

Sep. 21, 2016 (DE) ...................... 10 2016 218 094.0

(51) Int. Cl.
*B60T 13/74* (2006.01)
*B60T 13/68* (2006.01)
(Continued)

(52) U.S. Cl.
CPC .............. *B60T 13/745* (2013.01); *B60T 8/17* (2013.01); *B60T 8/368* (2013.01); *B60T 8/3675* (2013.01);
(Continued)

(58) Field of Classification Search
CPC ...... B60T 8/368; B60T 13/745; B60T 13/686; G01L 19/0645; G01L 9/0055; F04B 9/02;
(Continued)

(56) References Cited

U.S. PATENT DOCUMENTS 6,079,798 A * 6/2000 Hosoya .................. B60T 8/363
303/119.3
6,120,114 A * 9/2000 Blazic ................... B60T 8/3675
303/119.2
(Continued)

FOREIGN PATENT DOCUMENTS

CN 101367365 A 2/2009
DE 4133879 A1 4/1993
(Continued)

OTHER PUBLICATIONS

German Search Report for German Application No. 10 2016 218 094.0, with partial translation, dated Sep. 13, 2017—8 pages.
(Continued)

*Primary Examiner* — Kenneth J Hansen
*Assistant Examiner* — Benjamin Doyle
(74) *Attorney, Agent, or Firm* — RatnerPrestia

(57) ABSTRACT

An electrohydraulic motor vehicle control device, in particular for a motor vehicle brake system, includes a hydraulic unit with electrically activated valves, an electronic
(Continued)

control unit which includes a first printed circuit board with electric and/or electronic components for actuating the valves, and an electric motor for driving an electrically controllable, hydraulic pressure source, wherein electric and/or electronic components, in particular power electronics components for actuating the electric motor are arranged on a second printed circuit board which is arranged separately from the electronic control unit.

13 Claims, 2 Drawing Sheets

(51) Int. Cl.
| | | |
|---|---|---|
| H02K 11/33 | (2016.01) | |
| F04B 17/03 | (2006.01) | |
| F04B 9/02 | (2006.01) | |
| B60T 8/40 | (2006.01) | |
| B60T 8/36 | (2006.01) | |
| H02K 7/14 | (2006.01) | |
| B60T 13/66 | (2006.01) | |
| F04B 1/00 | (2020.01) | |
| B60T 8/17 | (2006.01) | |
| B60T 13/16 | (2006.01) | |
| F16H 25/20 | (2006.01) | |
| H02K 3/50 | (2006.01) | |
| H02K 7/06 | (2006.01) | |
| H02K 9/22 | (2006.01) | |

(52) U.S. Cl.
CPC .......... *B60T 8/4081* (2013.01); *B60T 13/161* (2013.01); *B60T 13/662* (2013.01); *B60T 13/686* (2013.01); *F04B 1/00* (2013.01); *F04B 9/02* (2013.01); *F04B 17/03* (2013.01); *F16H 25/20* (2013.01); *H02K 3/50* (2013.01); *H02K 7/06* (2013.01); *H02K 7/14* (2013.01); *H02K 9/22* (2013.01); *H02K 11/33* (2016.01); *H02K 2203/03* (2013.01); *H02K 2211/03* (2013.01)

(58) Field of Classification Search
CPC ........... F04B 17/03; F16H 25/20; H02K 3/50; H02K 7/06; H02K 11/33; H02K 2203/03
USPC ........................................................ 417/338
See application file for complete search history.

(56) References Cited

U.S. PATENT DOCUMENTS

| | | | | |
|---|---|---|---|---|
| 6,241,489 | B1* | 6/2001 | Lewin .................... | B60T 8/368 |
| | | | | 417/410.1 |
| 6,305,758 | B1* | 10/2001 | Hageman ................ | B60T 8/326 |
| | | | | 303/113.4 |
| 6,354,674 | B1* | 3/2002 | Iwamoto ................. | B60T 8/368 |
| | | | | 303/119.3 |
| 6,634,723 | B1* | 10/2003 | Ganzel ................... | B60T 8/368 |
| | | | | 303/119.3 |
| 6,969,128 | B2* | 11/2005 | Sekihara ................. | B60T 8/368 |
| | | | | 303/113.1 |
| 8,112,196 | B2 | 2/2012 | Takayanagi | |
| 8,780,564 | B2* | 7/2014 | Yanai .................... | B60T 13/686 |
| | | | | 361/720 |
| 9,103,354 | B2* | 8/2015 | Yahagi ................... | B60T 13/686 |
| 9,446,753 | B2 | 9/2016 | Feigel et al. | |
| 9,566,964 | B2 | 2/2017 | Jürgens | |
| 9,598,061 | B2 | 3/2017 | Heise | |

| | | | | |
|---|---|---|---|---|
| 2004/0075339 | A1* | 4/2004 | Volz ........................ | H02K 7/14 |
| | | | | 303/116.4 |
| 2006/0108884 | A1* | 5/2006 | Shiino .................... | B60T 8/267 |
| | | | | 310/89 |
| 2006/0109625 | A1* | 5/2006 | Harris .................... | G06F 1/263 |
| | | | | 361/695 |
| 2006/0125314 | A1* | 6/2006 | Hashiba .................. | B60T 17/02 |
| | | | | 303/113.1 |
| 2008/0017174 | A1* | 1/2008 | Kafer ................... | H05K 7/20854 |
| | | | | 123/479 |
| 2008/0036292 | A1* | 2/2008 | Sakai ...................... | B60T 8/368 |
| | | | | 303/11 |
| 2009/0030571 | A1 | 1/2009 | Takayanagi | |
| 2009/0189437 | A1 | 7/2009 | Takimoto | |
| 2009/0189439 | A1* | 7/2009 | Abe ....................... | G01L 9/0055 |
| | | | | 303/113.1 |
| 2009/0189440 | A1* | 7/2009 | Abe ........................ | B60T 8/368 |
| | | | | 303/114.1 |
| 2010/0032597 | A1* | 2/2010 | Beer ...................... | B60T 8/4063 |
| | | | | 251/129.01 |
| 2011/0062775 | A1* | 3/2011 | Iyatani ................... | B60T 15/00 |
| | | | | 303/20 |
| 2012/0205967 | A1* | 8/2012 | Mahnkopf ............... | B60T 8/38 |
| | | | | 303/2 |
| 2014/0216866 | A1* | 8/2014 | Feigel .................... | B60T 13/66 |
| | | | | 188/156 |
| 2015/0075156 | A1* | 3/2015 | Nakano ................. | B60T 13/745 |
| | | | | 60/545 |
| 2015/0174366 | A1* | 6/2015 | Taha ................. | A61M 25/0026 |
| | | | | 604/523 |
| 2016/0016567 | A1* | 1/2016 | Jurgens ................. | B60T 8/4086 |
| | | | | 303/10 |
| 2016/0264113 | A1* | 9/2016 | Feigel .................... | B60T 7/042 |
| 2016/0264114 | A1 | 9/2016 | Maruo et al. | |
| 2018/0065605 | A1* | 3/2018 | Leiber .................... | B60T 7/042 |

FOREIGN PATENT DOCUMENTS

| | | |
|---|---|---|
| DE | 29712033 U1 | 12/1998 |
| DE | 10350316 A1 | 5/2004 |
| DE | 102007000436 A1 | 2/2008 |
| DE | 102009056765 A1 | 6/2011 |
| DE | 102012213216 A1 | 2/2013 |
| DE | 102012220485 A1 | 5/2014 |
| EP | 1016515 A2 | 7/2000 |
| WO | 02060734 A1 | 8/2002 |
| WO | 2013023953 A1 | 2/2013 |
| WO | 2014124925 A1 | 8/2014 |

OTHER PUBLICATIONS

International Search Report and Written Opinion for Application No. PCT/EP2017/073547, dated Jan. 17, 2018—8 pages.
Chinese Office Action for Chinese Application No. 201780057274. 6, dated Oct. 10, 2020, with translation, 12 pages.
Korean Decision for Grant of Patent for Korean Application No. 10-2019-7008131, dated Oct. 27, 2020, with translation, 5 pages.
Final Office Action for U.S. Appl. No. 16/331,582, dated Mar. 11, 2021, 20 pages.
Chinese Office Action for Chinese Application No. 201780057274. 6, dated Jul. 14, 2021 with translation, 14 pages.
Chinese Office Action for Chinese Application No. 201780057716. 7, dated Jul. 16, 2021 with Search Report, 8 pages.
Programmable Logic Controllers (PLC), 2009, 5 pages.
Non Final Office Action for U.S. Appl. No. 16/331,582, dated Aug. 2, 2021, 18 pages.
Final Office Action for U.S. Appl. No. 16/331,582, dated Jan. 11, 2022, 20 pages.

* cited by examiner

1

ELECTROHYDRAULIC MOTOR VEHICLE CONTROL DEVICE COMPRISING A HYDRAULIC UNIT COMPRISING ELECTRIC COMPONENTS FOR ACTUATING AN ELECTRIC MOTOR ARRANGED ON A SECOND CIRCUIT BOARD EMBODIED REDUNDANTLY IN TWO PARTS WHEREIN THE TWO PARTS DEFINE AT LEAST A PART OF AN OPENING THROUGH WHICH A PRESSURE SOURCE EXTENDS

CROSS REFERENCE TO RELATED APPLICATIONS

This application is the U.S. National Phase Application of PCT International Application No. PCT/EP2017/073547, filed Sep. 19, 2017, which claims priority to German Patent Application No. 10 2016 218 094.0, filed Sep. 21, 2016, the contents of such applications being incorporated by reference herein.

FIELD OF THE INVENTION

The invention relates to an electrohydraulic motor vehicle control device.

BACKGROUND OF THE INVENTION

DE 10 2012 220 485 A1, incorporated herein by reference, has disclosed an electrohydraulic motor vehicle control device which comprises a hydraulic unit, an electric motor and an electronic control unit having a first printed circuit board for accommodating electric and/or electronic components.

WO 2013/023953 A1, incorporated herein by reference, has disclosed a brake activation unit in which a master brake cylinder which can be actuated by the vehicle driver, an electrically controllable pressure supply device and a valve arrangement are arranged in a housing. The electric motor of the pressure supply device is attached to a first side face of the housing. The electronic open-loop and closed-loop control unit of the brake activation unit is arranged on the second side face of the housing, facing in the opposite direction from the electric motor. This electronic open-loop and closed-loop control unit serves here both to actuate the valve arrangement and to actuate the pressure supply device, and the power electronics components of the electric motor of the pressure supply device are therefore integrated, together with the other electronic components (e.g. for actuating the valve arrangement), into this electronic open-loop and closed-loop control unit. The electrical connections between the electric motor and the electronic open-loop and closed-loop control unit therefore have to be led to the housing. The formation of contact with the electric motor and the electronic open-loop and closed-loop control unit requires a plug which is costly, large and expensive owing to the required insensitivity to micro-friction which can be brought about by changing degrees of expansion when there are changes in temperature. Furthermore, a costly cooling mechanism is necessary for cooling the electronic open-loop and closed-loop control unit, which comprises the power electronics of the electric motor. It is also disadvantageous that the line cross sections which are required for the power electronics within a printed circuit board of the electronic open-loop and closed-loop control unit give rise to an expensive printed circuit board which is over-dimensioned for the other large regions of the printed circuit board where only signal lines have to be routed.

SUMMARY OF THE INVENTION

An aspect of the present invention aims to overcome the specified disadvantages. Furthermore, a compact electrohydraulic motor vehicle control unit, in particular for a brake-by-wire brake system for motor vehicles, is to be made available which is cost-effective to manufacture.

An aspect of the invention is based on the concept that in an electrohydraulic motor vehicle control device having a hydraulic unit, an electric motor for driving an electrically controllable, hydraulic pressure source of the motor vehicle control device and an electronic control unit for actuating the electrically controllable components of the motor vehicle control device, the electric and/or electronic components for actuating the electric motor are arranged on a second printed circuit board which is arranged separately from the electronic control unit.

Power electronics components for actuating the electric motor are preferably arranged on the second printed circuit board. The entire power electronics of the electric motor are particularly preferably arranged on the second printed circuit board. Six driver components and one integrated circuit module for actuating the driver elements (as the entire power electronics of the electric motor) are quite particularly preferably arranged on the second printed circuit board.

The electric motor is preferably a brushless direct current motor.

The electric motor is preferably at least partially enclosed by a motor housing. The motor housing is particularly preferably injection-molded around the electric motor.

The electrically controllable, hydraulic pressure source is preferably arranged at least partially inside the hydraulic unit. A pressure space of the pressure source is particularly preferably arranged at least partially inside the hydraulic unit.

According to one embodiment of the motor vehicle control device according to an aspect of the invention, the electronic control unit and the electric motor are arranged on different side faces of the hydraulic unit, wherein the second printed circuit board is arranged in the region of the side face on which the electric motor is arranged. A compact motor vehicle control device with the smallest possible side faces is therefore possible. Furthermore, the electric and/or electronic components for actuating the electric motor are arranged in the vicinity of the electric motor. The electronic control unit and the electric motor are particularly preferably arranged on side faces of the hydraulic unit which lie opposite one another.

The hydraulic unit is preferably constructed essentially in a cuboid shape.

The hydraulic unit preferably has a first side face and a second side face, wherein the electronic control unit is arranged on the first side face, and electric motor is arranged on the second side face, and wherein the second printed circuit board is arranged in the region of the second side face. The first and the second side faces particularly preferably lie opposite one another.

The electronic control unit is preferably arranged on the side face which faces in the opposite direction from the electric motor, in order to permit a simple electrical or magnetic connection between the valve arrangement and the control unit.

The motor vehicle control device, in particular the hydraulic unit, preferably comprises at least one brake pedal activation travel-determining device or a pressure sensor. The brake pedal activation travel-determining device and/or the pressure sensor are particularly preferably arranged in the region of the side face with respect to the electronic control unit.

The second printed circuit board is preferably arranged between the hydraulic unit and the electric motor. This permits the heat generated by the electric and/or electronic components for actuating the electric motor to be conducted away directly to the hydraulic unit.

The second circuit board preferably has an opening through which part of the pressure source is led. Owing to the opening, a space-saving arrangement of the second printed circuit board is possible e.g. between the hydraulic unit and the electric motor.

The pressure source is preferably embodied as a hydraulic cylinder-piston arrangement whose piston can be shifted by the electric motor by means of a rotary-translatory gear mechanism.

A cylinder or a rotary-translatory gear mechanism of the pressure source is preferably led through the opening in the second printed circuit board.

According to one preferred embodiment of the motor vehicle control device according to an aspect of the invention, contact is made with the terminals of the motor windings of the electric motor directly on the second printed circuit board. Therefore, a more cost-intensive power distribution terminal or detachable plug-type connection for the terminals of the motor windings can be dispensed with.

The electric motor is preferably encapsulated with a motor housing by injection molding. At least one electric or electronic component of the second printed circuit board is particularly preferably arranged in a pocket in the injection-molded encapsulation. A capacitor or an inductor is particularly preferably arranged in a pocket in the injection-molded encapsulation. The available space is therefore utilized to an optimum degree.

According to one preferred development of an aspect of the invention, the second printed circuit board is embodied in two parts with a first and a second printed circuit board part.

The printed circuit board parts are particularly preferably embodied in such a way that they form the opening for leading through part of the pressure source.

Furthermore, it is particularly preferred that the electric and/or electronic components, advantageously the power electronics for actuating the electric motor on the first and second printed circuit board parts are embodied redundantly.

The supply of the second printed circuit board with electrical energy is preferably embodied redundantly. A first and a second energy source for supplying the second printed circuit board are particularly preferably present. In order to bring about redundant actuation of the electric motor, it is advantageous that the first energy source supplies the first printed circuit board part and the second energy source supplies the second printed circuit board part.

Arranged in the hydraulic unit is preferably a brake-pedal-activated master brake cylinder which bounds at least one piston and a hydraulic pressure space, wherein wheel brakes can be connected to the pressure space, and wherein the piston can be actuated by means of a pressure rod which transmits activation forces.

The motor vehicle control device preferably comprises a brake pedal sensation stimulator which is arranged at least partially in the hydraulic unit.

One advantage of an aspect of the invention is that the heat of the electric and/or electronic components can be conducted away more easily and more cost-effectively since the high currents during the actuation of the electric motor are conducted separately from the first printed circuit board of the electronic control unit, specifically only on the second printed circuit board. A costly cooling system for the electric and/or electronic components which conduct high currents is necessary only on the second printed circuit board. The electronic control unit and/or the first printed circuit board then conduct any comparatively low currents which are sufficient e.g. for actuating the valves and it is therefore possible to dispense with a costly cooling system of the first printed circuit board or in the electronic control unit.

An aspect of the invention also has the advantage that the first printed circuit board can be made more cost-effective, in particular with relatively small line cross sections.

Furthermore, an aspect of the invention provides the advantage that there is no need for any costly through-connections, in particular for high-current lines, through the hydraulic unit.

According to one preferred embodiment of an aspect of the invention, the valves are arranged on the side face of the hydraulic unit facing the opposite direction from the electric motor.

A pressure medium reservoir vessel which is under atmospheric pressure is preferably attached to an upper side face of the hydraulic unit.

The motor vehicle control device is preferably used in a brake system for motor vehicles, which brake system can be activated in a "brake-by-wire" mode of operation both by the vehicle driver and also independently of the vehicle driver, preferably is operated in the "brake-by-wire" mode of operation and can be operated in at least one fallback mode of operation in which only operation by the vehicle driver is possible.

BRIEF DESCRIPTION OF THE DRAWINGS

Further preferred embodiments of aspects of the invention will emerge from the subclaims and the following description with reference to figures.

In the figures.

DETAILED DESCRIPTION OF THE PREFERRED EMBODIMENTS

Figure 1:
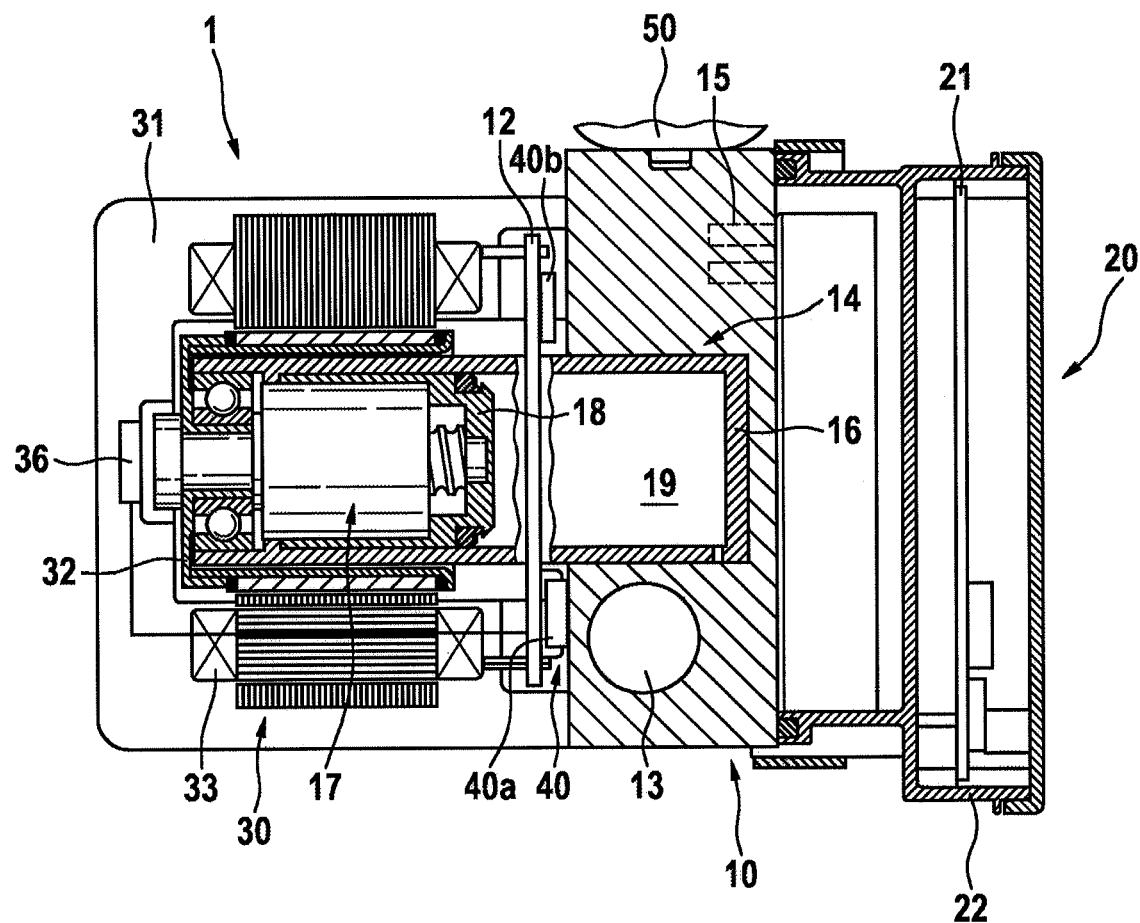
FIG. 1 shows an exemplary embodiment of an electrohydraulic motor vehicle control device according to an aspect of the invention.

FIG. 1 shows a schematic illustration of an exemplary embodiment of an electrohydraulic motor vehicle control device according to an aspect of the invention for a motor vehicle brake system with hydraulically activated wheel brakes. A motor vehicle control device 1 comprises a hydraulic unit 10 (HCU: hydraulic control unit) with electrically activated valves 15, an electronic control unit 20 (ECU: electronic control unit) and an electric motor 30 driving an electrically controllable, hydraulic pressure source 14. A (second) printed circuit board 12, on which electric and/or electronic components 40a, 40b for actuating the electric motor 30 are arranged is arranged separately from the electronic control unit 20. For example, the power electronics 40 of the electric motor 30 are arranged on the printed circuit board 12.

The electric motor 30 comprises a rotor 32 and a stator 33 and is embodied, for example, as a brushless direct current motor. The electric motor 30 is, for example, at least partially enclosed by a motor housing 31. The motor housing 31 is embodied as a plastic injection-molded part.

An electric motor 30 is arranged on a first side face of the hydraulic unit 10.

The hydraulic unit 10 comprises, for example, in addition to the valves 15, a master brake cylinder 13, illustrated only schematically, in the form of a cylinder bore in the hydraulic unit 10. The master brake cylinder 13 comprises at least one hydraulic pressure space and an activation piston (not illustrated) which can be activated by a vehicle driver by means of a pressure rod and which bounds the hydraulic pressure space. The wheel brakes (not illustrated) of the motor vehicle brake system can be connected to the pressure space by means of hydraulic connections. The master brake cylinder 13 serves e.g. for the application of pressure to the wheel brakes by the driver in a fallback operating mode of the brake system when the wheel brakes are connected to the pressure space of the master brake cylinder 13. The longitudinal axis of the master brake cylinder 13 is advantageously arranged essentially parallel to the direction of travel of the motor vehicle.

The electrically activated valves 15 of the hydraulic unit 10 are provided e.g. for setting wheel-specific brake pressures at the wheel brakes and/or for disconnecting/connecting the pressure source 14 or the master brake cylinder 13 to the wheel brakes.

The electrically controllable pressure source 14 is embodied, for example, as a hydraulic cylinder-piston arrangement whose piston 18 can be shifted in a cylinder 16 along the longitudinal axis (cylinder axis) of the cylinder-piston arrangement by the electric motor 30 by means of a rotary-translatory gear mechanism 17. The gear mechanism 17 is embodied, for example, as a ball screw drive or roller screw drive. A merely schematically indicated rotor position sensor system which serves to detect the rotor position of the electric motor 30 is denoted by the reference number 36.

In a brake-by-wire operating mode of the brake system, the wheel brakes can be actuated by means of the pressure in the pressure space 19 of the pressure source 14. For this purpose, the electric motor 30 can be actuated in accordance with activation of the brake pedal.

The pressure source 14 is arranged at least partially inside the hydraulic unit 10. For example, the cylinder 16 extends through the printed circuit board 12, which for this purpose has an opening (see reference number 45 or 45' in FIGS. 2 and 3), and into the hydraulic unit 10.

A pressure medium reservoir vessel 50 which is under atmospheric pressure is preferably arranged on an upper side face of the hydraulic unit 10.

The master brake cylinder 13, the valves 15 and the pressure source 14 are arranged entirely or at least partially inside the hydraulic unit 10.

The hydraulic unit 10 furthermore comprises hydraulic ports (not illustrated) for the connections to the wheel brakes.

The longitudinal axis of the electric motor 30 is arranged perpendicularly or approximately perpendicularly with respect to the longitudinal axis of the master brake cylinder 13. Likewise, the longitudinal axis of the pressure source 14 is arranged perpendicularly or approximately perpendicularly with respect to the longitudinal axis of the master brake cylinder 13. The electric motor 30 and the cylinder-piston arrangement of the pressure source 14 are arranged aligned on a common axis.

The control unit 20 comprises a (first) printed circuit board 21 on which electric and/or electronic components for actuating the valves 15 of the hydraulic unit 10 are arranged. Furthermore, at least one connecting plug, for supplying the electronic control unit 20 or the printed circuit board 21 with electrical energy is provided on the first printed circuit board 21. The printed circuit board 21 is advantageously protected by a control device housing 22.

The control unit 20 serves at least to actuate the valves 15 and is arranged, for example, on a second side face of the hydraulic unit 10 facing in the opposite direction from the electric motor 30. The electrical connections between the electric motor 30 and the control unit 20, e.g. for transmitting (sensor) signals, advantageously extend through the hydraulic unit 10 in order to protect the electrical connections.

The valves 15 are advantageously also arranged on the side face of the hydraulic unit 10 facing in the opposite direction from the electric motor 30, with the result that a simple electrical or magnetic connection between the valves 15 and the electronic control unit 20 is possible. The valves 15 are advantageously covered by the control device housing 22.

The motor vehicle control device 1 advantageously comprises a brake pedal sensation simulator (not illustrated) which, in the brake-by-wire operating mode, imparts a pleasant brake pedal sensation to the vehicle driver. The brake pedal sensation simulator can extend entirely or partially inside the hydraulic unit 10. Alternatively, the brake pedal sensation simulator can be embodied as a stand-alone module.

In order to supply the motor vehicle control device 1 with electrical energy, for example a first electrical energy supply unit and a second electrical energy supply unit are provided (not illustrated in FIG. 1), wherein the two energy supply units are independent of one another.

In motor vehicle control devices in which the power electronics of the electric motor are integrated into the electronic control unit which is arranged on the side of the hydraulic unit facing in the opposite direction from the electric motor or on the (first) printed circuit board of the electronic control unit, the formation of contact with the electric motor and electronic control unit or first printed circuit board requires a plug which is costly, large and expensive owing to the required insensitivity to micro-friction (caused by changing degrees of thermal expansion). Furthermore, a costly cooling mechanism is necessary for cooling the power electronics. It is also disadvantageous that the line cross sections which are required for the power electronics inside the (first) printed circuit board give rise to an expensive printed circuit board which is over-dimensioned for the other large regions of the printed circuit board where only signal lines have to be routed.

The specified disadvantages are eliminated, for example, by the arrangement of the power electronics 40 of the electric motor 30 on a second printed circuit board 12 which is arranged separately from the electronic control unit 20. As a result, advantages are also obtained with respect to the box volume of the motor vehicle control device 1, the costs and the performance. It is also possible to implement a redundant normal braking function (i.e. brake-by-wire function) in a relatively cost-effective fashion by means of a redundant embodiment of the second printed circuit board 12, while retaining the first printed circuit board 21.

For example, the power electronics components are (or the second printed circuit board 12 is) arranged on the electric motor side of the hydraulic unit 10 in order to actuate the electric motor 30, i.e. the second printed circuit board 12 is arranged in the region of the side face on which the electric motor 30 is arranged. In this context, the electronic control unit 20, on the one hand, and the electric motor 30 and the second printed circuit board 12, on the other hand, are arranged on different side faces of the hydraulic unit 10. The first printed circuit board 21 of the electronic control unit 20 (which does not comprise power electronics components for actuating the electric motor) can therefore be made significantly more cost-effective without thick copper layers. The power electronics components for actuating the electric motor 30 (the power electronics 40) are advantageously arranged on the side face of the hydraulic unit 10 lying opposite the electronic control unit 20. As a result, the costly through-connection of the high power lines through the hydraulic unit 10 is no longer necessary. The high-current, and therefore expensive, second printed circuit board 12 is smaller in comparison with the first printed circuit board 21.

The arrangement, illustrated in FIG. 1, of the second printed circuit board 12 (or power electronics) between the electric motor 30 and hydraulic unit 10 is particularly advantageous. As result, it is possible to conduct away the heat of the drivers and processor components (the power electronics 40) directly to the hydraulic unit 10. As a result, costly cooling measures on the side of the electronic control unit 20 or the first printed circuit board 21 are dispensed with.

In order to obtain a more compact overall design and therefore to reduce the box volume, the printed circuit board 12 with the power electronics 40 is arranged in the immediate space between the stator 33 and the hydraulic unit 10.

Figure 2:
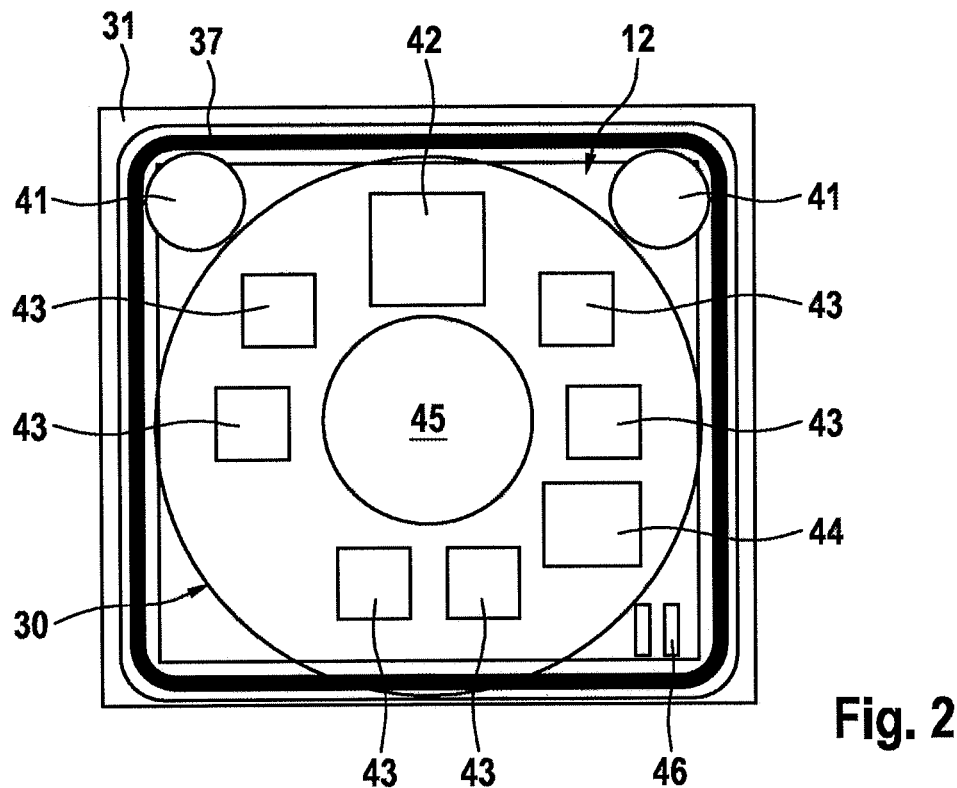
FIG. 2 shows a first exemplary embodiment of a second printed circuit board.
Figure 3:
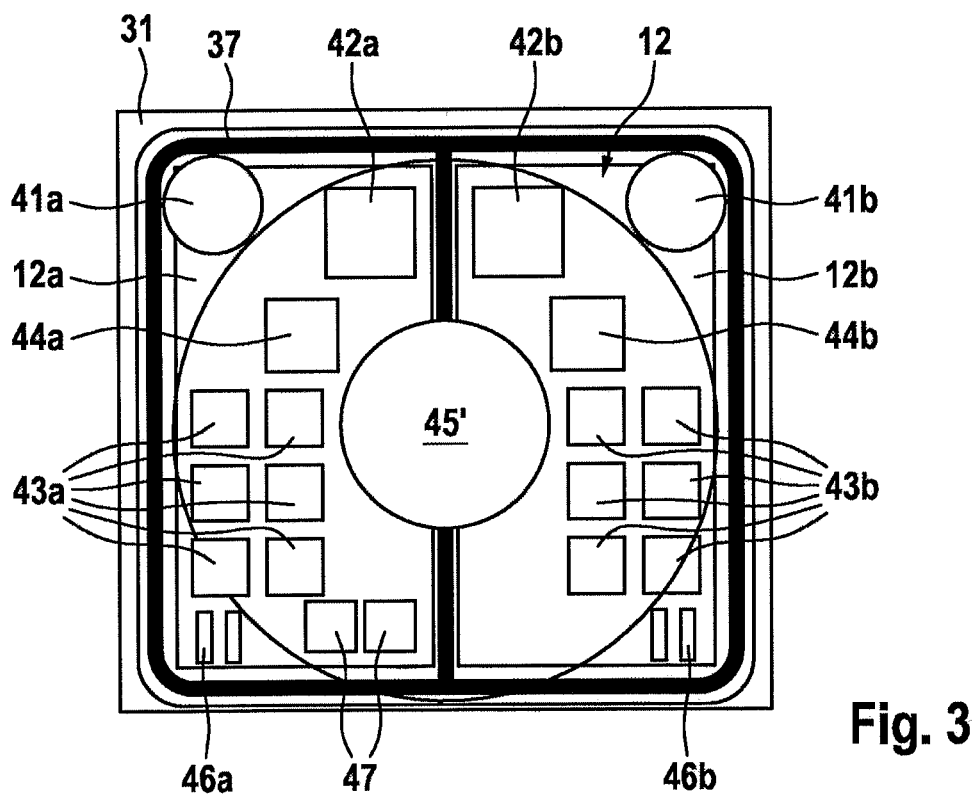
FIG. 3 shows a second exemplary embodiment of a second printed circuit board.

In order to arrange the second printed circuit board 12 between the electric motor 30 and hydraulic unit 10, the second printed circuit board 12 has an opening (see FIGS. 2 and 3). Part of the pressure source 14 is led through the opening. For example, the cylinder 16 of the pressure source 14 is led through the opening.

Furthermore, when the connecting ends of the motor windings of the electric motor 30 are correspondingly implemented, an operation for forming direct contact (e.g. soldering, welding or press-fit) with the second printed circuit board is carried out. Therefore, an expensive plug for the purpose of current distribution which combines the windings of the electric motor separately can be dispensed with. A higher utilisation rate of the on-board power system voltage level is also possible by virtue of the electrical connection which is robust and provided with low resistance values compared to a detachable plug-type connection.

FIG. 2 illustrates a first exemplary embodiment of a second printed circuit board 12. FIG. 2 also shows the motor housing 31, a seal 37 and the electric motor 30 which is indicated schematically by a circle and is arranged behind the printed circuit board 12. The printed circuit board 12 is embodied in one part and has an opening 45 in the form of a hole for leading to the pressure source 14. Furthermore, for example at least one capacitor 41, a microcontroller 42 for performing open-loop/closed-loop control of the electric motor 30, at least one driver component 43, a further microcontroller 44 (GDU: Gate Driver Unit) and a connecting element 46 for connecting to an electrical energy source are provided on the printed circuit board 12.

The GDU 44 is preferably an integrated circuit module with elements which actuate and monitor the bridge drivers 43. The modules are used to perform actuation in three-phase brushless motors. Alternatively, the drivers 43 can be integrated into the GDU 44.

The power electronics components which have the purpose of actuating the electric motor 30 and are arranged on the second printed circuit board 12 preferably comprise six driver components 43 and the GDU 44. The capacitors 41 are particularly preferably also arranged on the second printed circuit board 12.

At least one capacitor 41, in particular the capacitors, at least one coil (inductance) is advantageously accommodated in one or more pockets in the injection-molded encapsulation of the engine.

Furthermore, preferably at least one plug is connected on the motor side.

FIG. 3 illustrates a second exemplary embodiment of a second printed circuit board 12. In contrast to the exemplary embodiment in FIG. 2, the printed circuit board 12 is embodied in two parts with a first printed circuit board part 12a and a second printed circuit board part 12b.

The printed circuit parts 12a, 12b are shaped, for example, with one semicircular cutout each, in such a way that they form an opening 45' for leading through the pressure source 14.

The electronics of the printed circuit board 12 are advantageously embodied redundantly on the two printed circuit board parts 12a, 12b. For example, at least one a capacitor 41a or 41b, a microcontroller 42a or 42b is provided for performing open-loop/closed-loop control of the electric motor 30, at least one driver component 43a or 43b, a GDU 44a or 44b and a connecting element 46a or 46b for connecting to an electrical energy source are provided on each of the printed circuit board parts 12a, 12b. Each printed circuit board part 12a, 12b is advantageously supplied by a separate electrical energy source (redundant energy supply).

The power electronics components, which have the purpose of actuating the electric motor 30 and are arranged each of the printed circuit board parts 12a, 12b, preferably comprise six driver components 43a or 43b and the GDU 44a or 44b.

At least one driver 47 for actuating an electric parking brake or integrated parking brake is advantageously provided on the printed circuit board 12, for example on one of the printed circuit board parts 12a.

A further advantage of the separation of the power electronics 40 of the electric motor 30 from rest of the electronics of the electronic control unit 20 is the reduction in the number of possible common mode faults in the case of redundant integration of the electronics. It is therefore possible, for example, for the redundant voltage supply (if appropriate also 48 V) to be kept completely away from the electronic control unit (20).

The invention claimed is:

1. An electrohydraulic motor vehicle control device, for a motor vehicle brake system, comprising:
   a hydraulic unit with electrically activated valves,
   an electronic control unit which comprises a first printed circuit board with electric and/or electronic components for actuating the valves, and
   an electric motor for driving an electrically controllable, hydraulic pressure source,
   wherein electric and/or electronic components for actuating the electric motor are arranged on a second printed circuit board which is arranged separately from the electronic control unit,
   wherein the second printed circuit board is embodied in two parts with a first and a second printed circuit board part, wherein the electric and/or electronic components for actuating the electric motor are embodied redundantly on the first and second printed circuit board parts, and wherein the second printed circuit board has an opening through which part of the pressure source extends, and wherein the first and second printed circuit board parts form the opening through which the part of the pressure source extends, with the opening defined at least in part by an edge of the first printed circuit board part and an edge of the second printed circuit board part.

2. The motor vehicle control device as claimed in claim 1, wherein the electronic control unit and the electric motor are arranged on different side faces, facing opposite one another, of the hydraulic unit, and the second printed circuit board is arranged on the side face on which the electric motor is arranged.

3. The motor vehicle control device as claimed in claim 1, wherein the second printed circuit board is arranged between the hydraulic unit and the electric motor.

4. The motor vehicle control device as claimed in claim 1, wherein a cylinder or a rotary-translatory gear mechanism of the pressure source is led through the opening in the second printed circuit board.

5. The motor vehicle control device as claimed in claim 1, wherein the pressure source is embodied as a hydraulic cylinder-piston arrangement whose piston can be shifted by the electric motor by a rotary-translatory gear mechanism.

6. The motor vehicle control device as claimed in claim 1, wherein contact is made with terminals of motor windings of the electric motor directly on the second printed circuit board.

7. The motor vehicle control device as claimed in claim 1, wherein the electric motor is encapsulated by injection molding.

8. The motor vehicle control device as claimed in claim 7, wherein at least one electric or electronic component of the second printed circuit board is arranged in a pocket in the injection-molded encapsulation.

9. The motor vehicle control device as claimed in claim 1, wherein electrical energy supply of the second printed circuit board is embodied redundantly.

10. The motor vehicle control device as claimed in claim 1, wherein a brake-pedal-activated master brake cylinder is arranged in the hydraulic unit.

11. The motor vehicle control device as claim 1, wherein a brake pedal sensation simulator is arranged at least partially in the hydraulic unit.

12. The motor vehicle control device as claimed in claim 8, wherein the at least one electric or electronic component of the second printed circuit board is a capacitor or an inductor.

13. The motor vehicle control device as claimed in claim 2, wherein the second printed circuit board is arranged between the hydraulic unit and the electric motor.

* * * * *